United States Patent
Bloom et al.

(10) Patent No.: US 7,286,277 B2
(45) Date of Patent: Oct. 23, 2007

(54) POLARIZATION LIGHT MODULATOR

(75) Inventors: David M. Bloom, Jackson, WY (US); Mark C. Peterman, Jackson, WY (US)

(73) Assignee: ALCES Technology, Inc., Jackson, WY (US)

( * ) Notice: Subject to any disclaimer, the term of this patent is extended or adjusted under 35 U.S.C. 154(b) by 29 days.

(21) Appl. No.: 11/336,277

(22) Filed: Jan. 20, 2006

(65) Prior Publication Data
US 2006/0114544 A1 Jun. 1, 2006

Related U.S. Application Data (63) Continuation-in-part of application No. 11/161,452, filed on Aug. 3, 2005, which is a continuation-in-part of application No. 10/904,766, filed on Nov. 26, 2004, now Pat. No. 7,054,051.

(51) Int. Cl.
*G02F 1/01* (2006.01)
(52) U.S. Cl. .................................................. 359/279
(58) Field of Classification Search ................. 359/279
See application file for complete search history.

(56) References Cited

U.S. PATENT DOCUMENTS

| | | | |
|---|---|---|---|
| 4,710,732 A | 12/1987 | Hornbeck | |
| 5,311,360 A | 5/1994 | Bloom et al. | |
| 5,841,579 A | 11/1998 | Bloom et al. | |
| 5,982,553 A | 11/1999 | Bloom et al. | |
| 6,088,102 A | 7/2000 | Manhart | |
| 6,466,354 B1 | 10/2002 | Gudeman | |
| 6,724,515 B1 | 4/2004 | Kowarz | |
| 7,054,051 B1 * | 5/2006 | Bloom | 359/276 |
| 2002/0171932 A1 * | 11/2002 | Xiao | 359/484 |
| 2006/0072094 A1 * | 4/2006 | Honda | 355/67 |
| 2006/0114543 A1 * | 6/2006 | Bloom | 359/279 |
| 2006/0238851 A1 * | 10/2006 | Bloom | 359/279 |

* cited by examiner

*Primary Examiner*—Jordan Schwartz
*Assistant Examiner*—James C Jones
(74) *Attorney, Agent, or Firm*—Morrison Ulman (57) ABSTRACT

Polarization light modulators are based on an interferometric design in which a polarizing beam splitter serves as a polarizer and analyzer. A polarization displacement device shifts orthogonally polarized light beams parallel to the long axis of their elongated cross sections. Phase shifts are imparted to the orthogonally polarized beams by linear array MEMS optical phase shift devices. The output of the light modulator is a line image which may be scanned to form a two-dimensional image. Features to improve brightness, contrast and overall compactness of design are disclosed.

8 Claims, 8 Drawing Sheets

POLARIZATION LIGHT MODULATOR

RELATED APPLICATIONS

This application is a continuation-in-part of U.S. Ser. No. 11/161,452, filed on Aug. 3, 2005, which is a continuation-in-part of U.S. Ser. No. 10/904,766, filed on Nov. 26, 2004 now U.S. Pat. No. 7,054,051, both of which are incorporated herein by reference.

TECHNICAL FIELD

The invention relates generally to visual display devices and light modulator systems. In particular it relates to differential, interferometric light modulator systems containing optical polarization-sensitive devices.

BACKGROUND

Display devices such as television sets and movie projectors often incorporate a modulator for the purpose of distributing light into a two-dimensional pattern or image. For example, the frames of a movie reel modulate white light from a projector lamp into shapes and colors that form an image on a movie screen. In modern displays light modulators are used to turn on and off individual pixels in an image in response to electronic signals that control the modulator.

Texas Instruments introduced a microelectromechanical light modulator called a digital mirror device which includes millions of tiny mirrors on its surface. Each mirror corresponds to a pixel in an image and electronic signals in the chip cause the mirrors to move and reflect light in different directions to form bright or dark pixels. See, for example, U.S. Pat. No. 4,710,732 incorporated herein by reference. Stanford University and Silicon Light Machines developed a microelectromechanical chip called a grating light modulator in which diffraction gratings can be turned on and off to diffract light into bright or dark pixels. See, for example, U.S. Pat. No. 5,311,360 incorporated herein by reference.

Both of these reflective and diffractive light modulation schemes for displays involve two-dimensional arrays of light modulator elements. However, it is also possible to make a display in which light is incident on a linear array of high speed light modulators. With appropriate magnifying optics and scanning mirrors, a linear array can be made to appear two-dimensional to an observer. Through the scanning action of a vibrating mirror a single row of light modulators can be made to do the work of as many rows of modulators as would be necessary to provide a real two-dimensional display of the same resolution. See, for example, U.S. Pat. No. 5,982,553 incorporated herein by reference.

Manhart introduced a display apparatus including a grating light-valve array and interferometric optical system. See U.S. Pat. No. 6,088,102 incorporated herein by reference. In Manhart a display system employs a planar grating light-valve (GLV) array as a spatial light modulator for representing an image to be displayed. The system relies for image representation on the position of moveable reflective elements of the GLV array, which move through planes parallel to the plane of the array. The moveable elements provide, from an incident phase-contrast wavefront, a reflected phase-modulated wavefront representing the image to be displayed. The displayed image is provided by interferometrically combining the phase-modulated wavefront with a reference wave-front also formed, directly or indirectly, from the incident phase-contrast wavefront.

Many microelectromechanical light modulators are compatible with digital imaging techniques. Digital information may be sent electronically to the modulator. For example, gray scale images may be achieved by turning pixels on only part time. A pixel that is switched from bright to dark with a 50% duty cycle will appear to an observer to have a constant intensity half way between bright and dark. However, the pixel must be switched between bright or dark states faster than the human eye's critical flicker frequency of roughly 30 Hz or else it will appear to flicker. Therefore two-dimensional digital light modulators for displays must switch between states quickly to display a range of light levels between bright and dark.

A one-dimensional digital light modulator array, scanned by a vibrating mirror to make it appear two-dimensional, must incorporate modulators with fast switching speeds. Each modulator element must switch on and off quickly to provide the impression of gray scale and this action must be repeated for each pixel in a line within the scanning period of the mirror. Grating light modulator devices in particular exhibit high switching speeds because their mechanical elements move only very short distances. The grating light modulator incorporates parallel ribbon structures in which alternating ribbons are deflected electrostatically to form diffraction gratings. The ribbons need only move a distance of one quarter wavelength of light to switch a grating on or off. It is also possible (and desirable in many instances) to operate one- or two-dimensional light modulators in analog, rather than digital, modes.

Gudeman proposed an interferometric light modulator based on a mechanical structure very similar to the grating light modulator; see U.S. Pat. No. 6,466,354 incorporated herein by reference. Gudeman's light modulator is a form of Fabry-Perot interferometer based on a ribbon structure.

Microelectromechanical light modulators typified by the Texas Instruments' digital mirror device and Stanford/Silicon Light Machines grating light modulator devices mentioned above have already enjoyed wide commercial success and have spawned other related designs. See, for example, U.S. Pat. No. 6,724,515 incorporated herein by reference.

The digital mirror device is comparatively slow and therefore is usually supplied as a two-dimensional mirror array. Usually two dimensional modulator arrays are more expensive to make than one-dimensional arrays and require a sophisticated addressing scheme for the mirrors. A two-dimensional array requires defect-free manufacturing of N×N pixels over a large chip area while a one-dimensional array with the same image resolution requires only N working pixels on a chip in a single line.

Grating light modulator devices, while very fast, have limitations due to diffraction. A grating light modulator has a reflective state or configuration and a diffractive state. In the diffractive state incoming light is diffracted into the +1 and −1 diffraction orders of an optical grating. However, only about 80% of the light is collected in these two orders.

An interferometric light modulator that has many desirable features was disclosed in "Differential interferometric light modulator and image display device," U.S. Pat. No. 10/904,766 filed on Nov. 26, 2004, incorporated herein by reference. That device features high speed and high contrast. The interferometric design means that light is not lost in higher diffractive orders (as can be a problem in diffractive devices), nor does it require discriminating diffracted from undiffracted light.

In U.S. Pat. No. 10/904,766 a novel light modulator incorporates a polarizing prism to split light beams into components of orthogonal polarization. These polarization components are made to travel unequal distances in the modulator and are then recombined in the prism. When one polarization component is phase shifted with respect to the other, the overall polarization of the recombined beam is transformed. The polarization of the recombined beam is then analyzed by a polarizing beam splitter. Light intensity output from the polarizing beam splitter depends on the polarization state of the incident light beam which in turn depends on the relative phase shift of the polarization components.

A phase shift is imparted to the orthogonal polarization components in the modulator by focusing them on, and causing them to reflect from, an engineered, uneven surface. This phase shift surface has regions of slightly different displacement which cause the light beams to travel slightly different distances upon reflection. A novel microelectromechanical system (MEMS) ribbon array device is provided that is used to modulate the phase shift of light beams reflected from the surface of its ribbons.

Generalized and improved interferometric light modulators were disclosed in "Differential interferometric light modulator and image display system," U.S. Pat. No. 11/161,452 filed on Aug. 3, 2005, incorporated herein by reference. Optical polarization displacement devices, designs for MEMS optical phase shift devices and compensation schemes to improve field of view were described.

In U.S. Pat. No. 11/161,452 a differential interferometric light modulator and image display system comprises a polarizing beam splitter, a polarization displacement device and a MEMS optical phase shifting device. A linear array of MEMS optical phase shifting devices serves to modulate a line of pixels in the display. The polarizing beam splitter acts as both the polarizer and the analyzer in an interferometer. The polarization displacement device divides polarized light from a polarizer into orthogonal polarization components which propagate parallel to one another. The MEMS optical phase shifting device, or array of such devices, imparts a relative phase shift onto the polarization components and returns them to the polarization displacement device where they are recombined and sent to the analyzer. The MEMS optical phase shifting devices are electronically controlled and convert electronic image data (light modulation instructions) into actual light modulation.

Further development is always possible, however. It would be desirable to have a polarization light modulator design that is as compact as possible. Brightness and high contrast are important features of displays and are in need of continual improvement. For some applications, such as head-mounted displays, a viewer designed to be placed close to an observer's eye is needed.

BRIEF DESCRIPTION OF THE DRAWINGS

The drawings are heuristic for clarity.

DETAILED DESCRIPTION

Display systems manipulate light to form images of text, graphics and other visual scenes. Light propagation involves a complex variety of phenomena including wave properties and polarization. In related applications, U.S. Pat. No. 10/904,766 and U.S. Pat. No. 11/161,452, a new class of display systems was introduced that comprise polarization interferometers combined with MEMS devices that shift the phase of optical waves.

In these new systems a linear array of MEMS optical phase shifting devices serves to modulate a line of pixels in a displayed image. A polarizing beam splitter acts as both the polarizer and the analyzer in an interferometer while a polarization displacement device divides polarized light from the polarizer into orthogonal polarization components. The MEMS optical phase shifting device array imparts a relative phase shift onto the polarization components and returns them to the polarization displacement device where they are recombined and sent to the analyzer. The MEMS optical phase shifting devices are electronically controlled and convert electronic image data (light modulation instructions) into actual light modulation.

In the interferometric light modulators disclosed in U.S. Pat. No. 10/904,766 and U.S. Pat. No. 11/161,452, the direction of polarization displacement is parallel to the ribbons or cantilevers in the MEMS optical phase shift device. This means that the light forming a particular pixel comes from light that was reflected from different parts of a single ribbon or cantilever.

In this application a different optical arrangement is disclosed in which orthogonal polarizations are displaced perpendicular to ribbons in a MEMS optical phase shift device. Accordingly, light forming a displayed pixel comes from light reflected from more than one ribbon or cantilever. Also disclosed herein are optical designs for compact polarization light modulators and displays for close up viewing. Designs for MEMS optical phase shift devices are presented including optimizations for high power handling.

A polarization light modulator display relies on interferometry to modulate pixels in a displayed image. Interferometry in turn depends on manipulating the phase of light to produce constructive or destructive interference. An important part of a polarization light modulator is a device that separates polarization components of light so that the relative phase between them can be changed.

FIGS. 1A-1D show schematically various polarization separating optical elements. Elements shown in FIGS. 1A-1D were introduced in related applications U.S. Pat. No. 10/904,766 and U.S. Pat. No. 11/161,452; however, additional features are described here.

Figure 1A:
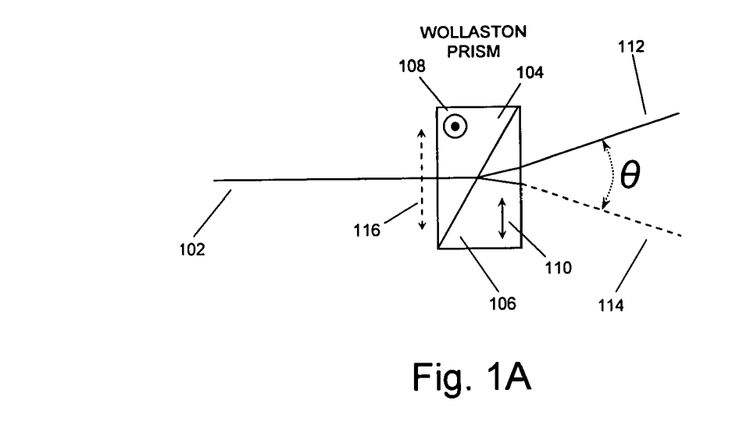
FIGS. 1A-1D show schematically various polarization separating optical elements.
Figure 1B:
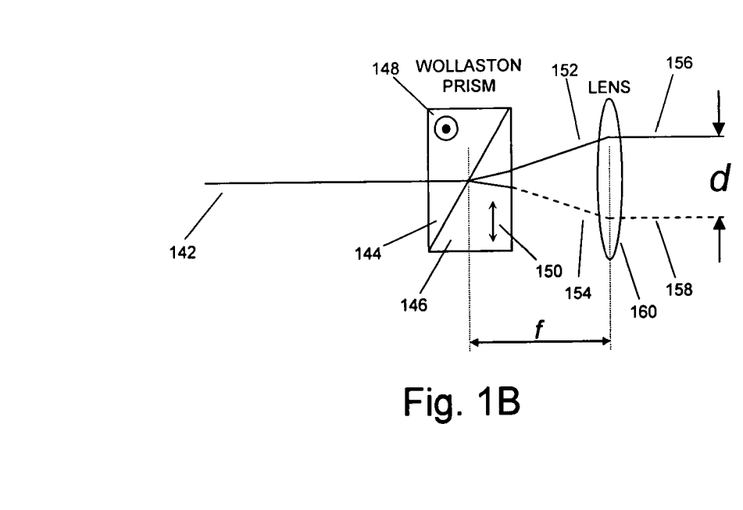
Figure 1C:
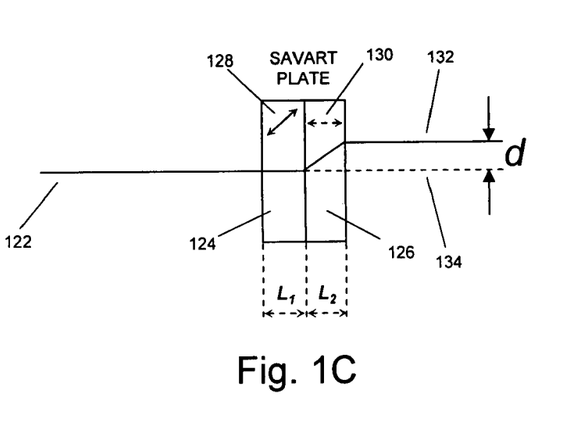
Figure 1D:
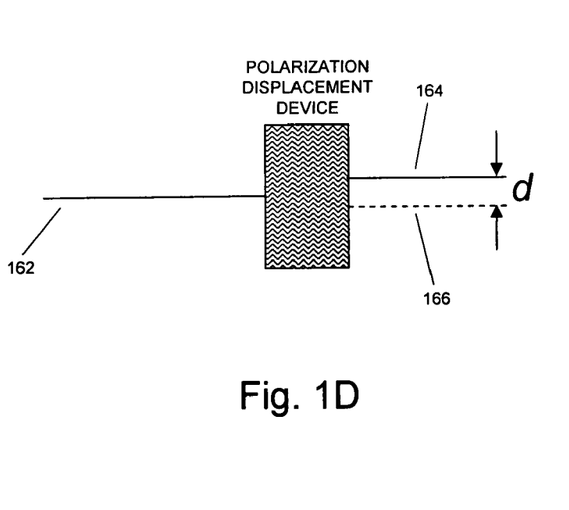

In FIG. 1A a Wollaston prism is shown. FIG. 1B shows a Wollaston prism in combination with a lens placed one focal distance away. FIG. 1C shows a Savart plate. FIG. 1D shows a generalized polarization displacement device.

The Wollaston prism shown in FIG. 1A splits incoming light beam 102 into orthogonally polarized components 112 and 114. Light beams 112 and 114 propagate away from each other indefinitely since they exit the prism at different angles. The Wollaston prism is composed of two pieces of material 104 and 106 with optic axes oriented as shown by arrows 108 and 110.

Dashed arrow 116 indicates that translation of the Wollaston prism perpendicular to incoming light beam 102 varies the properties of light beams 112 and 114. Translation varies the phase difference between the beams and therefore can be used to adjust the set point of an interferometer. Additionally, the prism can be tilted in the plane of the paper (i.e. about an axis perpendicular to the plane of the paper). Tilt can be used to make small adjustments in the separation angle, θ. This degree of freedom is helpful when matching polarization displacement to the distance from one ribbon to an adjacent ribbon in a MEMS optical phase shift device.

FIG. 1B shows a lens 160 placed one focal length away from a Wollaston prism. This situation is similar to that shown in FIG. 1A except that the orthogonally polarized light beams 156 and 158 exiting the system are parallel to one another. It is desirable that polarization displacement devices have this property, namely that light beams leave them parallel to one another. That way the beams retrace their path upon reflection from a MEMS optical phase shifting device. The separation, d, is related to the focal length, f, and the separation angle, θ, according to d=f·θ when θ is a small angle.

It is normally advantageous to replace two optical components with one whenever possible. Such a replacement is accomplished by the Savart plate illustrated in FIG. 1C. A Savart plate is an example of a walkoff crystal which imparts lateral displacement on polarization components of light incident upon it. (A Wollaston prism is an example of a birefringent prism which imparts angular separation on polarization components.) In FIG. 1C input light beam 122 is divided into orthogonally polarized components 132 and 134. The Savart plate is composed of two pieces of material 124 and 126 with optic axes oriented as shown by arrows 128 and 130. Arrow 130 is dashed to indicate that it does not lie in the plane of the page; in fact, it forms a 45 degree angle with the plane of the page.

Distances $L_1$ and $L_2$ indicate that thicknesses in the Savart plate vary the properties of light beams 132 and 134. These thicknesses can be designed to specify the set point of an interferometer. Additionally, the plate can be tilted in the plane of the paper (i.e. about an axis perpendicular to the plane of the paper). Tilt can be used to make small adjustments in the separation distance, d. This degree of freedom is helpful when matching polarization displacement to the distance from one ribbon to an adjacent ribbon in a MEMS optical phase shift device.

In general any device can be used as a polarization displacement device as long as it has the effect shown in FIG. 1D. An incoming light beam 162 is separated into two parallel light beams 164 and 166 which are polarized orthogonal to one another. Equivalently, if polarized light beams 164 and 166 are considered the input, then the device combines them into one beam 162. The polarization of beam 162 is then determined by the relative phase of the polarization components of beams 164 and 166.

As described here and in U.S. Pat. No. 10/904,766 and U.S. Pat. No. 11/161,452, a polarization displacement device may be made from a Wollaston, Rochon or Senarmont prism in combination with a lens, a Savart plate or a modification thereof, or any other optical components which have the same effect.

Figure 2A:
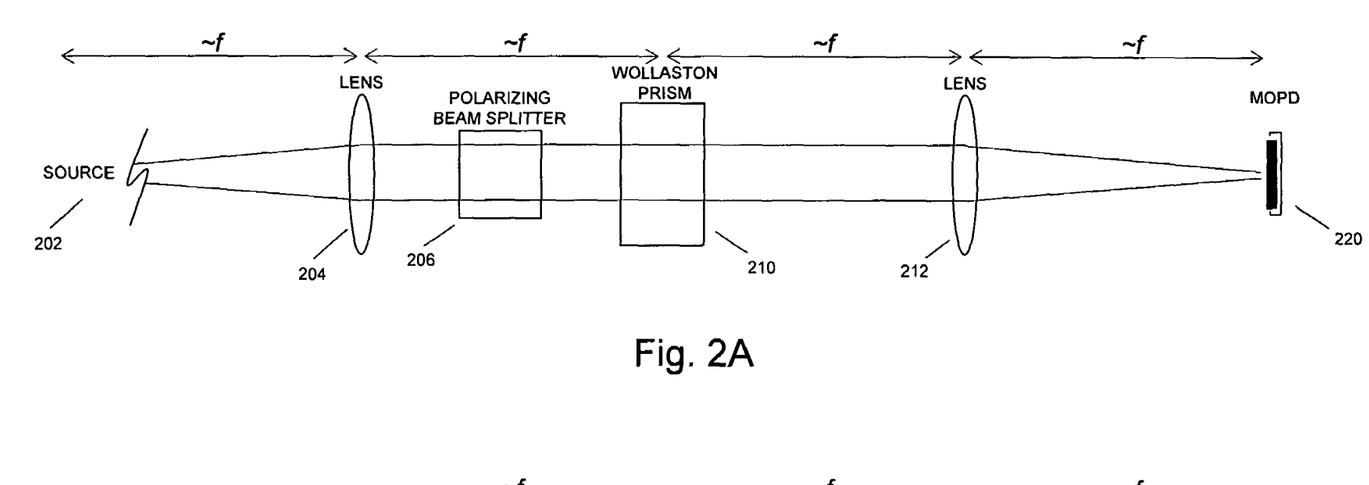
FIGS. 2A & 2B show a design for a polarization light modulator.
Figure 2B:
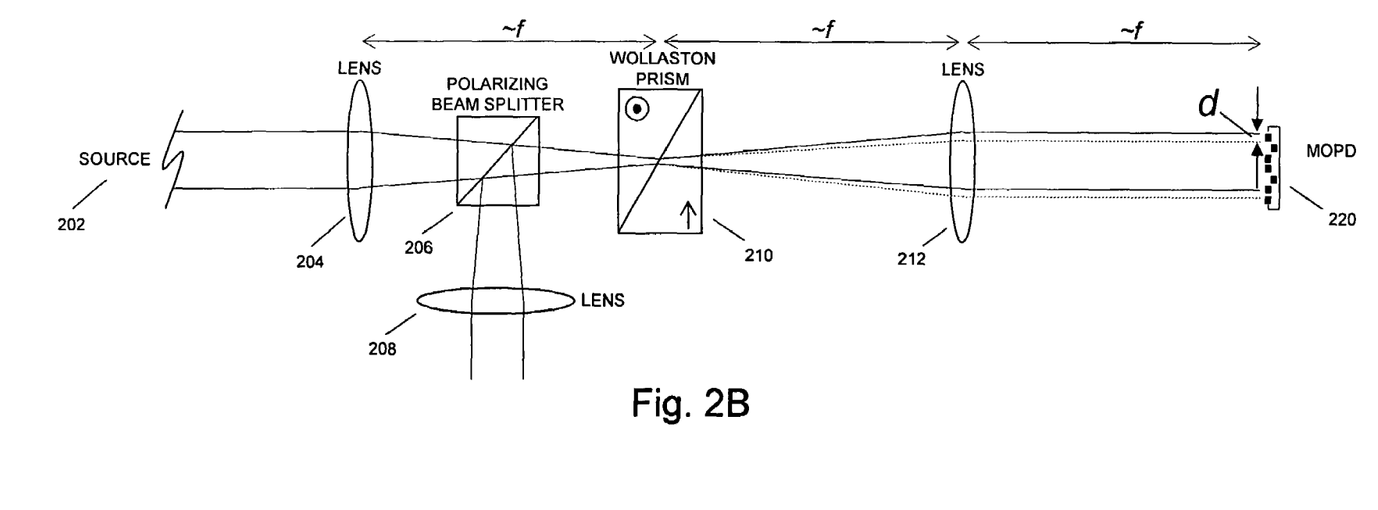

FIGS. 2A & 2B show a design for a polarization light modulator. FIGS. 2A and 2B are views of the same design from perpendicular perspectives. For convenience FIG. 2A may be referred to as a "top" view while FIG. 2B may be referred to as a "side" view.

In both views, light from source 202 propagates through various optical elements before reflecting from MEMS optical phase shift device (MOPD) 220. On the return trip from MOPD 220 toward source 202 part of the light is deflected toward lens 208 by polarizing beam splitter 206. This is illustrated in FIG. 2B only; in FIG. 2A lens 208 is hidden behind polarizing beam splitter 206.

Light from source 202 is focused at different places in different planes. For example in FIG. 2A the light is diverging from source 202 toward lens 204. In fact the source is placed approximately one focal length away from the lens so that light is collimated between lenses 204 and 212. MOPD 220 is placed approximately one focal length away from lens 212 such that the lens focuses light on it. Viewed from the perpendicular direction in FIG. 2B, however, light from source 202 is approximately collimated. Therefore, after the light passes through lens 204, travels a distance approximately equal to the combined focal lengths of lenses 204 and 212, and passes through lens 212, it is approximately collimated when it reaches MOPD 220.

An equivalent description is that light at MOPD 220 is focused in a narrow, slit-shaped cross section. At MOPD 220 the light is elongated perpendicular to the plane of the paper in FIG. 2A and in the plane of the paper in FIG. 2B. As described below this elongated illumination of the ribbon array in MOPD 220 is advantageous for efficient use of light and corresponding high brightness in a display.

Wollaston prism 210 and lens 212 form a polarization displacement device as described in U.S. Pat. No. 10/904,766 and U.S. Pat. No. 11/161,452. Accordingly different polarization displacement devices may be substituted for them without altering the principle of operation of the polarization light modulator.

The spatial relationship between the elongated focusing direction and the polarization displacement direction of the light in FIGS. 2A and 2B differs from that of previous designs described in U.S. Pat. No. 10/904,766 and U.S. Pat. No. 11/161,452. In previous designs the polarization displacement device separated light into slit-shaped beams that were offset in a direction perpendicular to the long axis of the slit-shaped cross section. Here the polarization displacement device (i.e. Wollaston prism 210 and lens 212) separates light into slit-shaped beams that are offset in a direction parallel to the long axis of the slit-shaped cross section. This is indicated by dotted lines in FIG. 2B which show part of the light in the system displaced by a distance, d, at MOPD 220. The displacement is not visible in FIG. 2A because it is perpendicular to the plane of the paper.

Figure 7A:
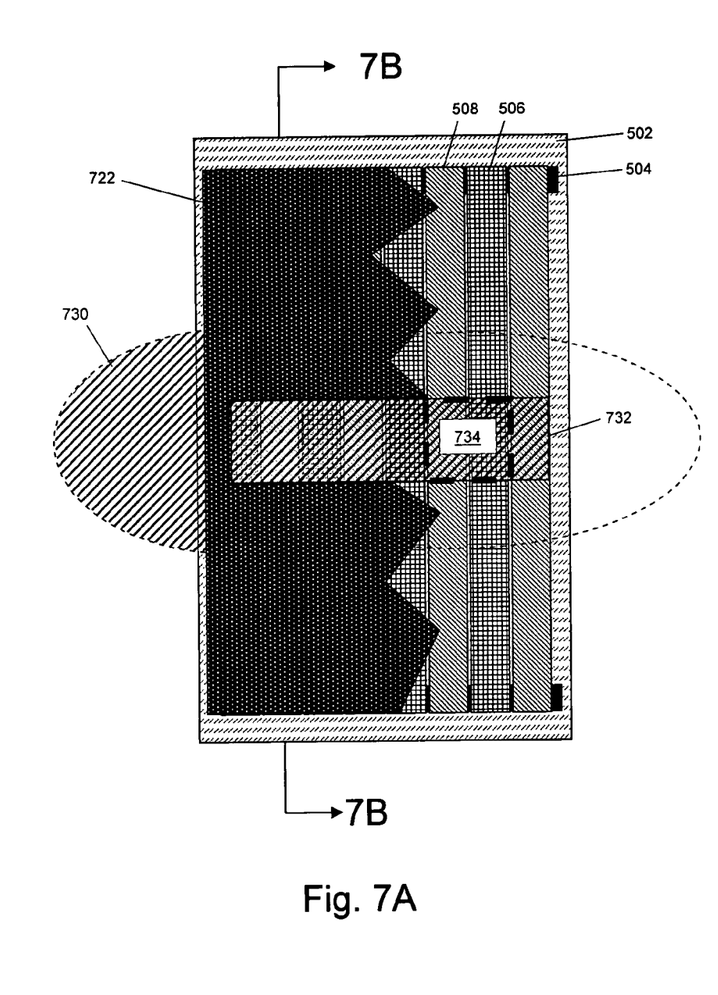
FIGS. 7A & 7B show schematically a MEMS optical phase shifting device with an aperture.

Polarization components of light arriving at MOPD 220 are offset perpendicular to the ribbons in the MOPD. This is also illustrated in FIG. 7A, for example, where region 734 (bounded by a heavy dashed line) encompasses orthogonal polarizations of light that are offset by the width of ribbon 506 or 508 in a direction perpendicular to the ribbons and in the plane of the paper.

In FIGS. 2A and 2B it is helpful if source 202 is a line source; however, if it is not, its shape can be modified by beam shaping optics (not shown). Polarizing beam splitter 206 acts as both the polarizer and the analyzer in the interferometer that it forms with the polarization displacement device (Wollaston prism 210 and lens 212) and the MOPD 220. Two arms of the interferometer are formed by orthogonal polarizations of light which travel slightly different paths to and from the MOPD.

FIGS. 2A and 2B source 202 is in line with lens 204, polarizing beam splitter 206, Wollaston prism 210, lens 212 and MEMS device 220. Light reflected by polarizing beam splitter 206 toward lens 208 forms a line image which may be scanned to create a two dimensional image. It is entirely possible however to place the light source in a position where lens 208 would focus its light into the optical system and to form a line image where source 202 is shown. The choice between these two equivalent arrangements depends on practicalities such as contrast achieved by the polarizing beam splitter in transmission versus reflection, and the shape of the light source used.

Figure 3A:
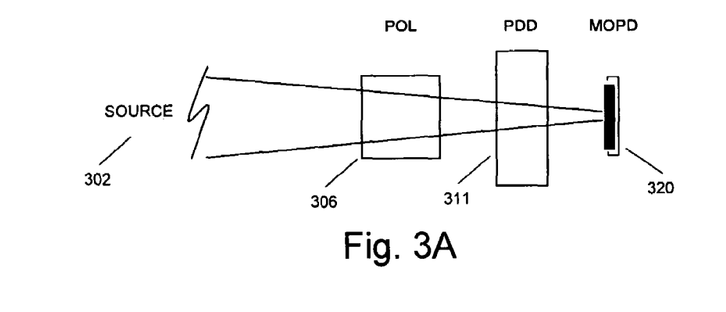
FIGS. 3A & 3B show a design for a compact polarization light modulator.
Figure 3B:
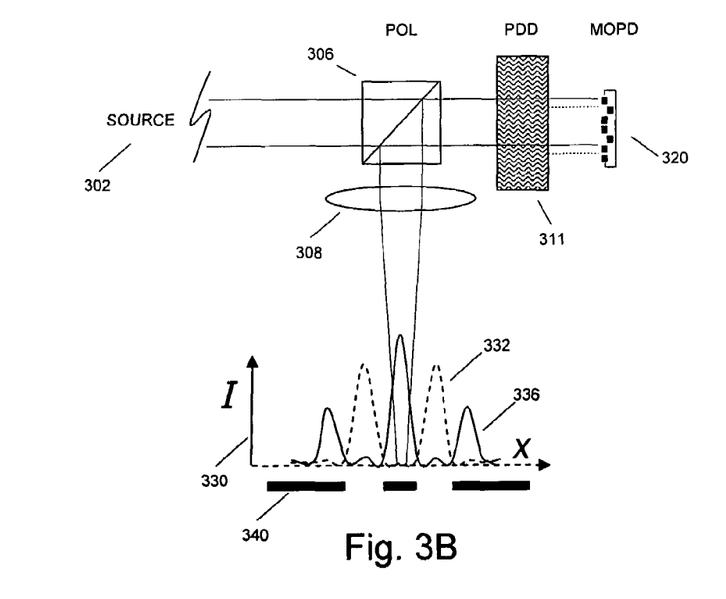

FIGS. 3A & 3B show a design for a compact polarization light modulator. FIGS. 3A and 3B are views of the same design from perpendicular perspectives. For convenience FIG. 3A may be referred to as a "top" view while FIG. 3B may be referred to as a "side" view. In the figures source 302 provides light that converges to a waist near MOPD 320 when viewed from the perspective of FIG. 3A but is collimated when viewed from the perpendicular perspective of FIG. 3B. Examples of suitable sources include line sources or point sources shaped by cylinder lenses (not shown).

PDD 311 is a "polarization displacement device" as that term is defined in U.S. Pat. No. 11/161,452. Its function is to offset orthogonally polarized components in an incoming light beam into two parallel beams of light. An example of a polarization displacement device is a polarizing prism, such as a Wollaston or Rochon prism, in combination with a lens. MOPD 320 is a "MEMS optical phase shift device" as that term is defined in U.S. Pat. No. 11/161,452. Its function is to impart an electronically controllable phase shift upon incident light. Many types of MOPD were discussed in U.S. Pat. No. 11/161,452. Details of one MOPD are discussed here in connection with FIGS. 5-8.

In FIG. 3B lens 308 is placed approximately one focal length away from MOPD 320. The lens is not shown in FIG. 3A because it is hidden behind polarizing beam splitter 306 in that view. Also drawn in FIG. 3B is a graph 330 of light intensity, l, versus position, x, in the focal plane of lens 308. In other words the dotted x-axis of graph 330 and MOPD 320 are both approximately one focal length away from lens 308, albeit in opposite directions. Two intensity plots 332 and 336 are drawn on graph 330. Item 340 is a double-slit aperture or stop.

The dotted x-axis of graph 330 lies in the Fourier plane for MOPD 320. Thus when MOPD is modulated, for example, in a square wave pattern where every other ribbon is deflected, the light intensity at the Fourier plane will be approximately that shown by plot 332. When the MOPD is unmodulated, i.e. when no ribbons are deflected, the light intensity at the Fourier plane will be approximately that shown by plot 336.

The available contrast between dark and light states in the polarization light modulators described so far is determined mainly by the ability of the polarizing beam splitter to discriminate between polarizations. In an ideal case all light of one polarization is transmitted by the polarizing beam splitter while all light of the orthogonal polarization is reflected. In practice, however, some light in the "wrong" polarization leaks through or is reflected unintentionally.

Double-slit aperture or stop 340 may be used to increase contrast in a polarization light modulator. If aperture 340 is placed at the Fourier plane of lens 308 it blocks light when MOPD 320 is unmodulated but passes light when the MOPD is modulated. This increases the contrast that is provided by the polarization discrimination of polarizing beam splitter 306.

The dotted x-axis of graph 330 lies in the Fourier plane of the MOPD as a whole; however, it is not the image plane for pixels in the line image that are modulated at the MOPD. When lens 308 is placed one focal length from MOPD 320, the line image is formed at infinity. The image can be brought closer to the lens by moving the lens away from the MOPD in accordance with the lens-maker's formula $1/d_1 + 1/d_2 = 1/f$ where $d_1$ and $d_2$ are distances to the image and the MOPD measured from the lens. Alternatively the image may be viewed with additional optics (not shown).

Figure 4A:
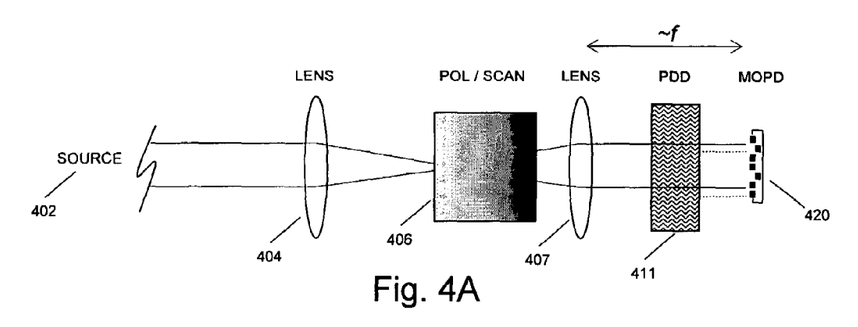
FIGS. 4A & 4B show a design for a polarization light modulator for close-up viewing.
Figure 4B:
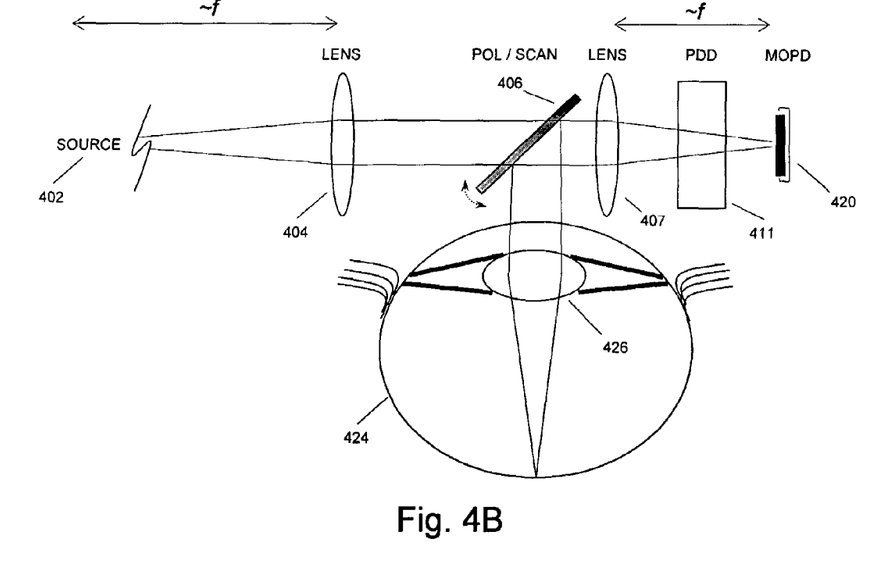

FIGS. 4A & 4B show a design for a polarization light modulator for close-up viewing. Such a design is appropriate for head-mounted displays where the observer's eye is close to the device.

FIGS. 4A and 4B are views of the same design from perpendicular perspectives. For convenience FIG. 4A may be referred to as a "top" view while FIG. 4B may be referred to as a "side" view. In the figures, source 402 provides light that is collimated when viewed from the perspective of FIG. 4A, but is diverging toward lens 404 when viewed from the perpendicular perspective of FIG. 4B. In FIG. 4B the source diverges from a location such that lens 404 collimates the light; i.e. the source is approximately one focal length away from lens 404. Examples of suitable sources include line sources or point sources shaped by cylinder lenses (not shown).

Item 406 in the figures is a thin polarizing beam splitter that also acts as a scanning mirror. It can be rotated about an axis (not shown) perpendicular to the paper in FIG. 4B. The curved arrow near the thin polarizing beam splitter 406 in FIG. 4B indicates the approximate scanning motion. Lens 407 is located approximately one focal length away from MOPD 420; item 411 is a polarization displacement device.

Viewed from the perspective of FIG. 4A light is focused to a waist between lenses 404 and 407 while it remains collimated between those two lenses in the perpendicular perspective of FIG. 4B. The focus need not coincide with the position of thin polarizing beam splitter 406.

The eye of an observer is drawn schematically in FIG. 4B as item 424; the lens of the eye is item 426. When lens 407 is placed one focal length from MOPD 420 the image of the MOPD appears at infinity. However, the lens 426 in the eye 424 of an observer forms the image on the retina in the back of the eye for easy viewing. The image is a line image that originates from a thin sheet of light modulated by a linear array of electronically controlled phase shifting surfaces in the MOPD. When thin polarizing beam splitter 406 rotates, the line image moves across the retina in an observer's eye. This scanning motion is used to create a two dimensional image from the line image.

Figure 5A:
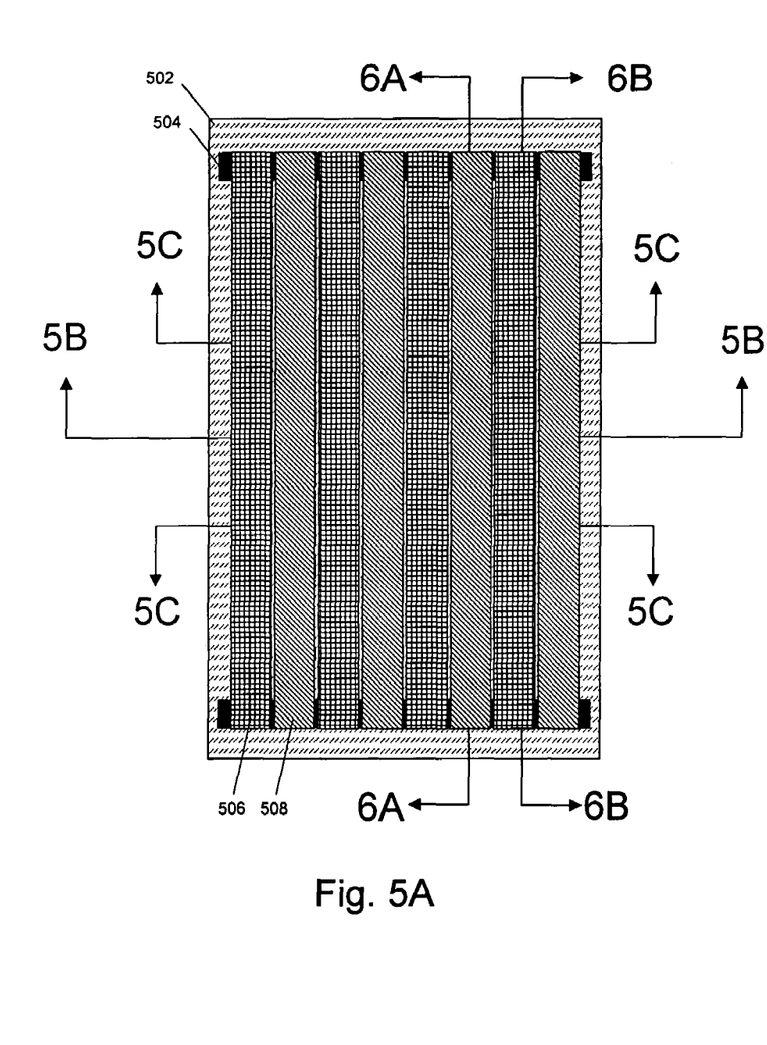
FIGS. 5A-5C show schematically a MEMS optical phase shifting device.
Figure 5B:
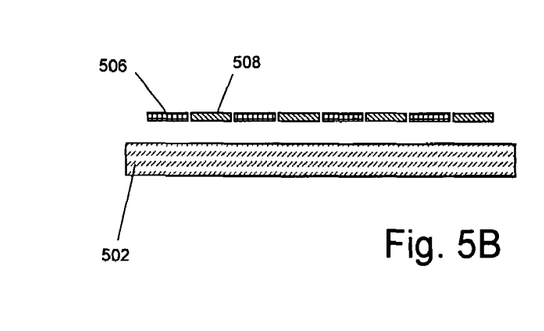
Figure 5C:
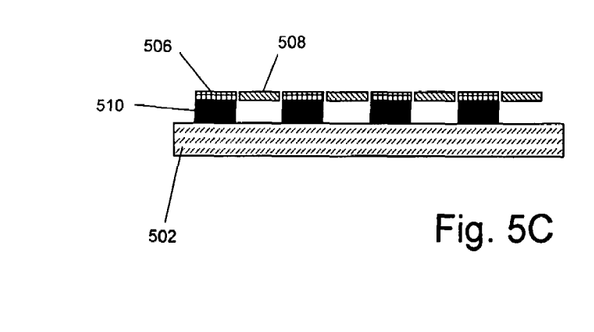

FIGS. 5A-5C show schematically a MEMS optical phase shifting device. FIGS. 5B and 5C are cross sections of FIG. 5A along the lines indicated. In FIGS. 5A-5C item 502 is a substrate or support base; 504 is an end support; 510 is an intermediate support. Items 506 and 508 are ribbon structures; 506 is a ribbon supported by intermediate supports while 508 is a ribbon without intermediate supports. In FIGS. 5A-5C only eight ribbons are shown while an actual device may contain hundreds or thousands of ribbons. The figure is schematic only.

FIG. 5B shows that at the cross section marked "5B" in FIG. 5A there are no supports between the substrate and the ribbons. Conversely FIG. 5C shows that at the cross sections marked "5C" in FIG. 5A there are supports for every other ribbon. In FIG. 5A cross sections "5C" are marked approximately ⅓ of the way from the ends of the ribbons and this is a preferred arrangement; however, other designs are possible. It is only important that every other ribbon is stiffened, by supports or other means, and that the center portion where light is reflected by the ribbons is free of supports.

Devices of the type shown in FIGS. 5A-5C may be constructed using any standard MEMS fabrication processes such as those outlined in U.S. Pat. No. 10/904,766. Although the drawings are not to scale one may appreciate the size of a typical device by noting that the ribbons are normally between about one and one hundred microns long; they flex toward the substrate by roughly 0.05 to 0.5 microns.

Figure 6A:
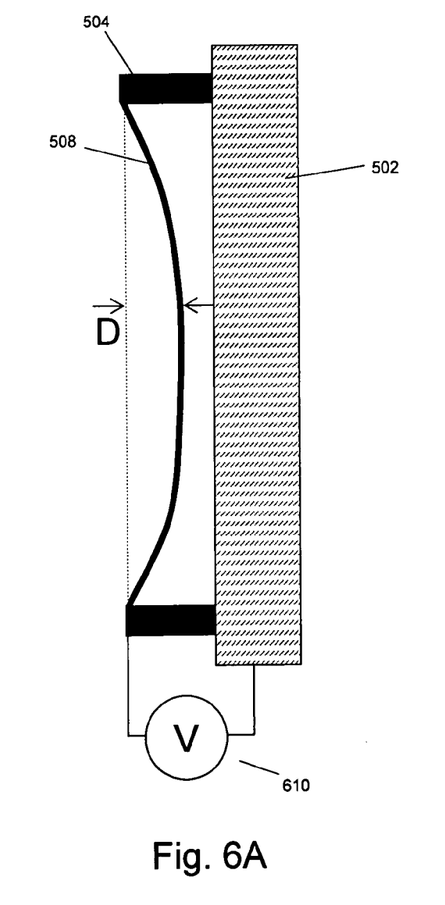
FIGS. 6A & 6B show schematically cross-sections of the device illustrated in FIG. 5A.
Figure 6B:
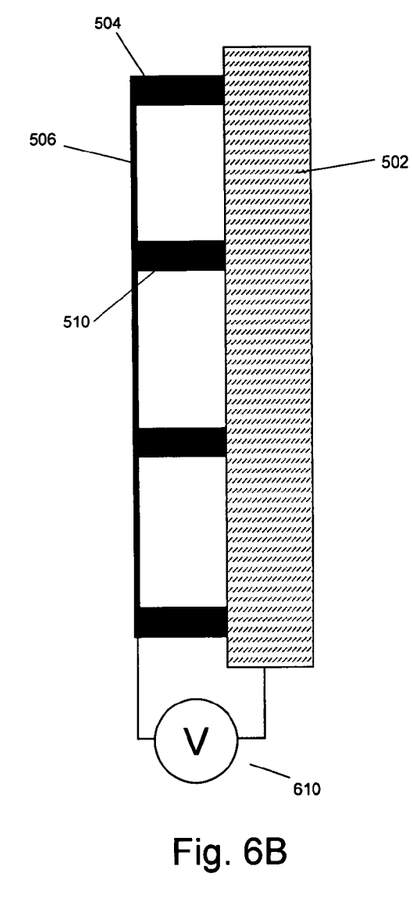

FIGS. 6A & 6B show schematically cross-sections of the device illustrated in FIG. 5A at the sections marked "6A" and "6B" respectively. All of the numbered items in FIGS. 6A and 6B correspond to the like-numbered items in FIGS. 5A-5C. Voltage signal or source 610 was not illustrated in FIGS. 5.

When a voltage is applied to a ribbon that is only supported at its ends, as exemplified by ribbon 508, the ribbon flexes toward the substrate. The distance, D, that the ribbon is deflected is approximately one quarter wavelength of light in normal operation of an MOPD in the polarization light modulators of FIGS. 2-4. Conversely when a voltage is applied to a ribbon that is supported by intermediate supports, as exemplified by ribbon 506, the ribbon flexes far less than in the unsupported case. Ribbon 506 in FIG. 6B is drawn as not flexing at all; in practice it may flex slightly. The deflection is a nonlinear function of the distance between supports, however, so it can be significantly different for the supported and unsupported ribbons.

An advantage of using supports to stiffen alternating ribbons is that each ribbon can be the same thickness and made from the same material. However alternate methods besides supports may be used if the end result remains the same: alternating ribbons are deflected different amounts under the influence of an applied voltage.

Figure 7B:
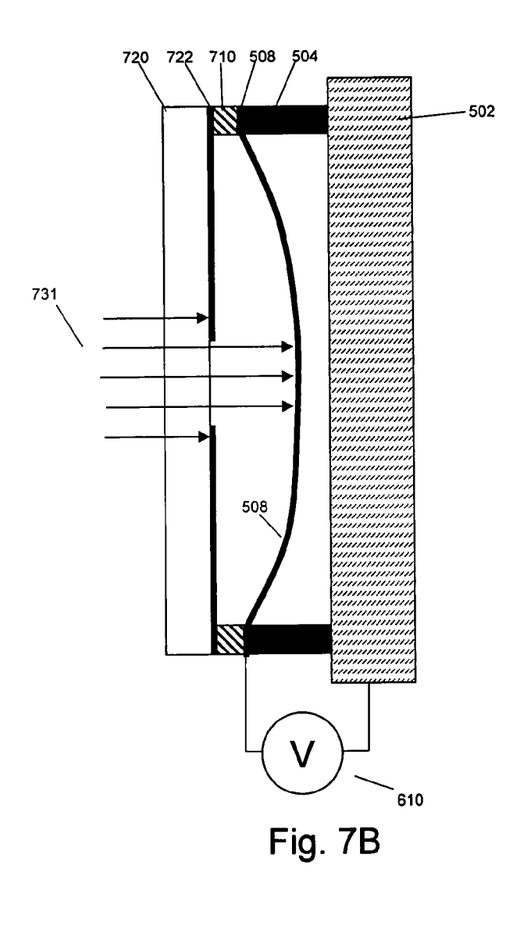

FIGS. 7A & 7B show schematically a MEMS optical phase shifting device with an aperture. FIG. 7A shows a view of an MOPD similar to the view shown in FIG. 5A while FIG. 7B shows a view similar to that in FIG. 6A. In FIGS. 7 however, an aperture 722 has been placed over the ribbon structure.

In FIGS. 7 items 502-610 are the same as like-numbered items in FIGS. 5 and 6. Item 710 is a spacer. Items 720 and 722 form an aperture structure from a clear sheet 720 with an opaque coating 722. In FIG. 7A aperture structure 720/722 is shown in a cutaway view. The hatched area and dotted line represented by 730 show the approximate extent of an elongated light beam incident upon the MOPD. Rays 731 also represent the light beam as viewed from a direction perpendicular to the direction of propagation.

Bounded region 732 represents the transverse extent of light that has passed through aperture structure 720/722 and is incident on the ribbons of the MOPD. Within bounded region 732, area 734, which is delineated by a heavy dashed border, shows the portion of the MOPD from which reflected light makes up a single pixel in the line image output from a polarization light modulator such as any of the modulators illustrated in FIGS. 2-4.

Aperture structure 720/722 prevents stray light that would not contribute to a line image from being reflected by the MOPD ribbons. Preferably the aperture does not affect the polarization of light reflecting from it. In FIGS. 7 the aperture is shown as a being formed by a patterned, opaque coating on a clear substrate such as glass; however, an aperture formed in another way but performing the same function is also acceptable. The aperture is separated from the ribbons of the MOPD by spacer 710. To keep the aperture in the near field, the spacer thickness should be less than $\sim w^2/\lambda$, where w is the size of the aperture and $\lambda$ is the wavelength of light.

Area 734 represents the area of the ribbon device from which reflected light forms a single pixel in a line image. Area 734 is shown as being approximately square in the figure, but it may be rectangular in practice. The length of one side of the area is set by the width of the open slot in aperture 720/722. The length of a perpendicular side of the area is equal to the width of two ribbons in the MOPD. Recall that the PDD in the polarization light modulators of FIGS. 2-4 provides an offset for one polarization of light incident upon an MOPD. The magnitude of the offset is shown by "d" in FIGS. 1B-1D, 2B, and by dotted lines in FIGS. 3B and 4A.

The polarization light modulator is designed so that the offset matches the width of a ribbon in the MOPD. That way the interferometer in the polarization light modulator compares the phase of light reflected by adjacent ribbons in the MOPD. As one of the ribbons in an adjacent pair moves while the other remains stationary, the phase of light reflected by the ribbons varies by $4\pi D/\lambda$ where D is the displacement of the moving ribbon and $\lambda$ is the wavelength of the light.

Figure 8:
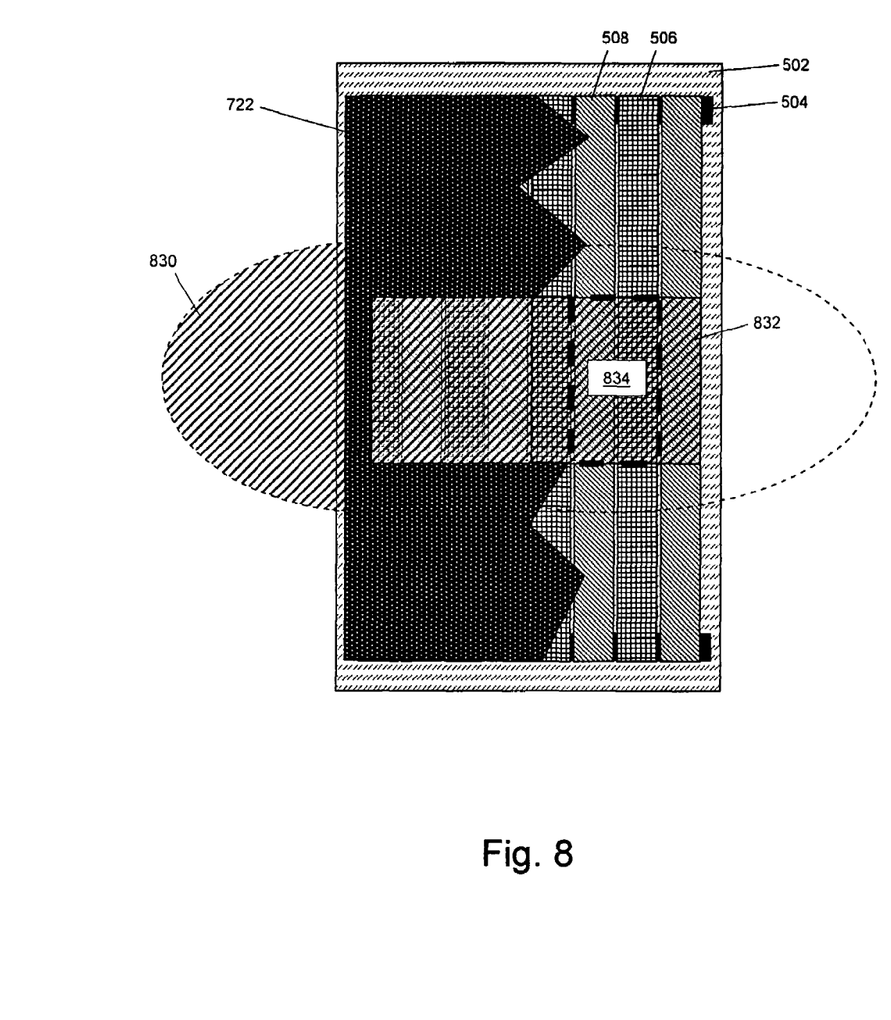
FIG. 8 shows schematically a MEMS optical phase shifting device with an aperture wider than that illustrated in FIG. 7A.

FIG. 8 shows schematically a MEMS optical phase shifting device with an aperture wider than that illustrated in FIG. 7A. In FIG. 8 bounded region 832 is drawn approximately twice as wide as corresponding bounded region 732 in FIG. 7; area 834 is similarly represented as a rectangle instead of square 734. The figure does not purport to illustrate the precise aspect ratios of these areas; but the possibility of using different aspect ratios is important. Light beam cross section 830 has a less elongated shape than corresponding beam 730.

All other things being equal the light incident upon the MOPD in FIG. 8 is spread over a wider area than that in FIG. 7A. Therefore if a material limitation makes it necessary to restrict the intensity (power per unit area) of light falling on the MOPD then more power can be applied to the MOPD in FIG. 8 compared to that of FIG. 7A. FIG. 8 represents a design with more power handling capacity and therefore one that can lead to a brighter displayed image than the one in FIG. 7A. An incoming light beam can be expanded for operation with a wider aperture slot as in FIG. 8 through the use of cylinder optics.

Polarization light modulators described herein focus light in an elongated beam cross section on a linear array MOPD. Orthogonal polarizations are displaced parallel to the long axis of the elongated beam cross section. Compact modulator designs optimized for high brightness and contrast were described.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A polarization light modulator comprising:
   a polarizing beam splitter;
   a polarization displacement device; and,
   a MEMS optical phase shift device; wherein,
   light propagates through the polarizing beam splitter and the polarization displacement device before arriving at the MEMS optical phase shift device in a beam of elongated cross section oriented perpendicular to ribbons in the MEMS optical phase shift device.

2. A modulator as in claim 1 wherein the polarization displacement device offsets orthogonal polarizations of light in a direction parallel to the long axis of the elongated cross section.

3. A modulator as in claim 2 wherein the polarizing beam splitter also functions as a scanning mirror.

4. A modulator as in claim 2 wherein a line image output from the modulator is focused near infinity for close viewing by an observer.

5. A modulator as in claim 2 further comprising an aperture that blocks stray light from arriving at the MEMS optical phase shift device.

6. A modulator as in claim 2 further comprising a double-slit aperture that improves contrast in a line image.

7. A modulator as in claim 2 wherein the MEMS optical phase shift device comprises ribbons of alternating stiffness.

8. A modulator as in claim 2 wherein the MEMS optical phase shift device comprises ribbons which are supported at their ends and in which alternating ribbons are further supported by intermediate supports.

* * * * *